Figure 1:
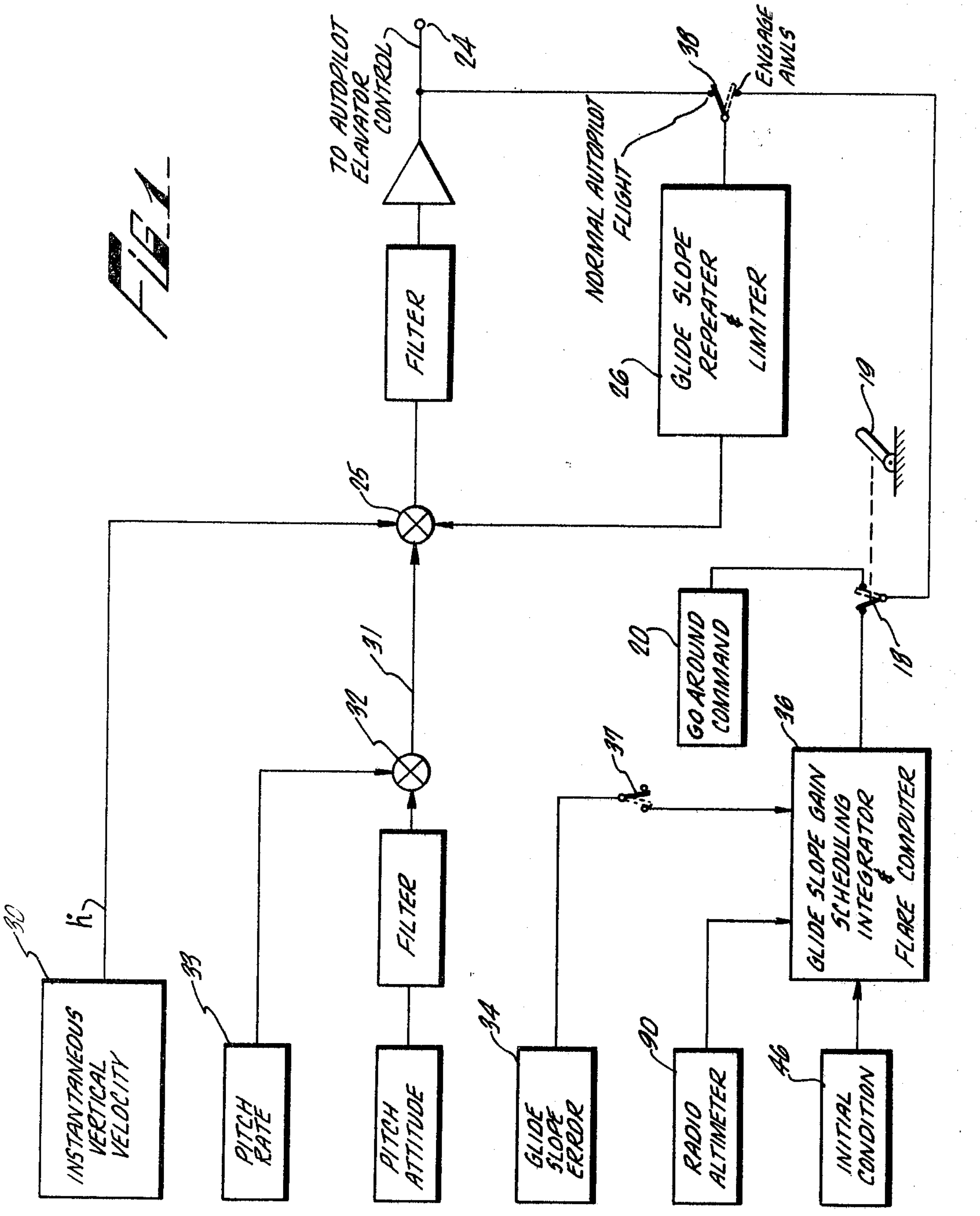

June 27, 1967 K. C. KRAMER ETAL 3,327,973

AUTOMATIC LANDING PITCH AXIS CONTROL SYSTEM FOR AIRCRAFT

Filed June 14, 1965 2 Sheets-Sheet 1

INVENTORS.
KENNETH C. KRAMER
DON M. ARCHIBALD

BY Christie, Parker & Hale
ATTORNEYS.

June 27, 1967 K. C. KRAMER ETAL 3,327,973

AUTOMATIC LANDING PITCH AXIS CONTROL SYSTEM FOR AIRCRAFT

Filed June 14, 1965 2 Sheets-Sheet 2

INVENTORS.
KENNETH C. KRAMER
DON W. ARCHIBALD

BY Christie, Parker & Hale
ATTORNEYS.

United States Patent Office 3,327,973

Patented June 27, 1967

3,327,973
AUTOMATIC LANDING PITCH AXIS CONTROL SYSTEM FOR AIRCRAFT

Kenneth C. Kramer, Woodland Hills, and Don M. Archibald, Malibu, Calif., assignors to Lear Siegler, Inc., Santa Monica, Calif., a corporation of Delaware Filed June 14, 1965, Ser. No. 463,811
9 Claims. (Cl. 244—77)

This invention relates to controls for automatic landing of an aircraft and more particularly relates to a new and improved system for automatically controlling the pitch axis of an aircraft during an automatic landing sequence.

There are today control systems which automatically fly an aircraft close to a landing runway and thereafter automatically approach that runway and flare-out for touchdown. An automatic landing system which utilizes an electrical signal transmitted along a desired flight path from a transmitter located on a runway is described and claimed in an issued patent having Patent No. 3,291,421, issued Dec. 13, 1966, entitled, "Pitch Controller for Automatic Landing," by Kenneth C. Kramer et al., and assigned to the same assignee as the present application.

In the automatic landing system of the referenced application a flare computer for glide path control is utilized during the approach by the aircraft to the runway. This computer continually produces an output command referenced in part to the flight path signal. Although entirely satisfactory for a great many applications, the landing system thereof does not achieve an automatic landing as smoothly and with as few abrupt attitude changes as does the system of this invention.

During normal flight and prior to the approach for an automatic landing, the system in the referenced application utilizes an autopilot system for controlling the elevators and thus the pitch attitude of the aircraft. Engagement of the automatic landing system in some rare instances applied a large error signal which commanded a fast response. This fast response caused an abrupt movement of the aircraft. Such abrupt movements are objectionable in commercial systems as it causes passenger alarm and discomfort.

Experience has shown that during the initial phase of the approach to the runway by the aircraft, it is highly desirable to achieve as fast a response to any deviations by the aircraft from the glide slope beam as possible without making that response so abrupt that passenger alarm or discomfort results. This fast response, we have discovered, may be achieved by a new and novel control system capable of emitting a continually varying signal that controls the elevators of the aircraft from a predetermined altitude throughout the final approach and on through to touchdown.

Emergencies may develop, which require that the aircraft, at some instant prior to touchdown, immediately leave the automatically scheduled approach pattern. Typical of such an emergency is another aircraft entering into the approach path of the landing aircraft. In accordance with this invention a reference source having a signal of a predetermined magnitude and opposite command action to the signals normally present at the elevator control when the aircraft is in the approach pattern, is applied to control the elevators in response to manual movement of a switch in the cockpit of the aircraft. This switch is mechanically operable in response to a full-throttle position inasmuch as this throttle condition is normally required for a go-around maneuver in order that full power is applied to the aircraft to guard against stalling.

This invention thus provides by its control system a faster response to glide slope errors than do the prior art systems, and in addition provides means for preventing any abrupt aircraft motion upon engagement of the automatic landing system. The principles of this invention further provide an automatic assist to command a go-around maneuver at any point prior to touchdown in the automatic landing sequence.

Figure 2:
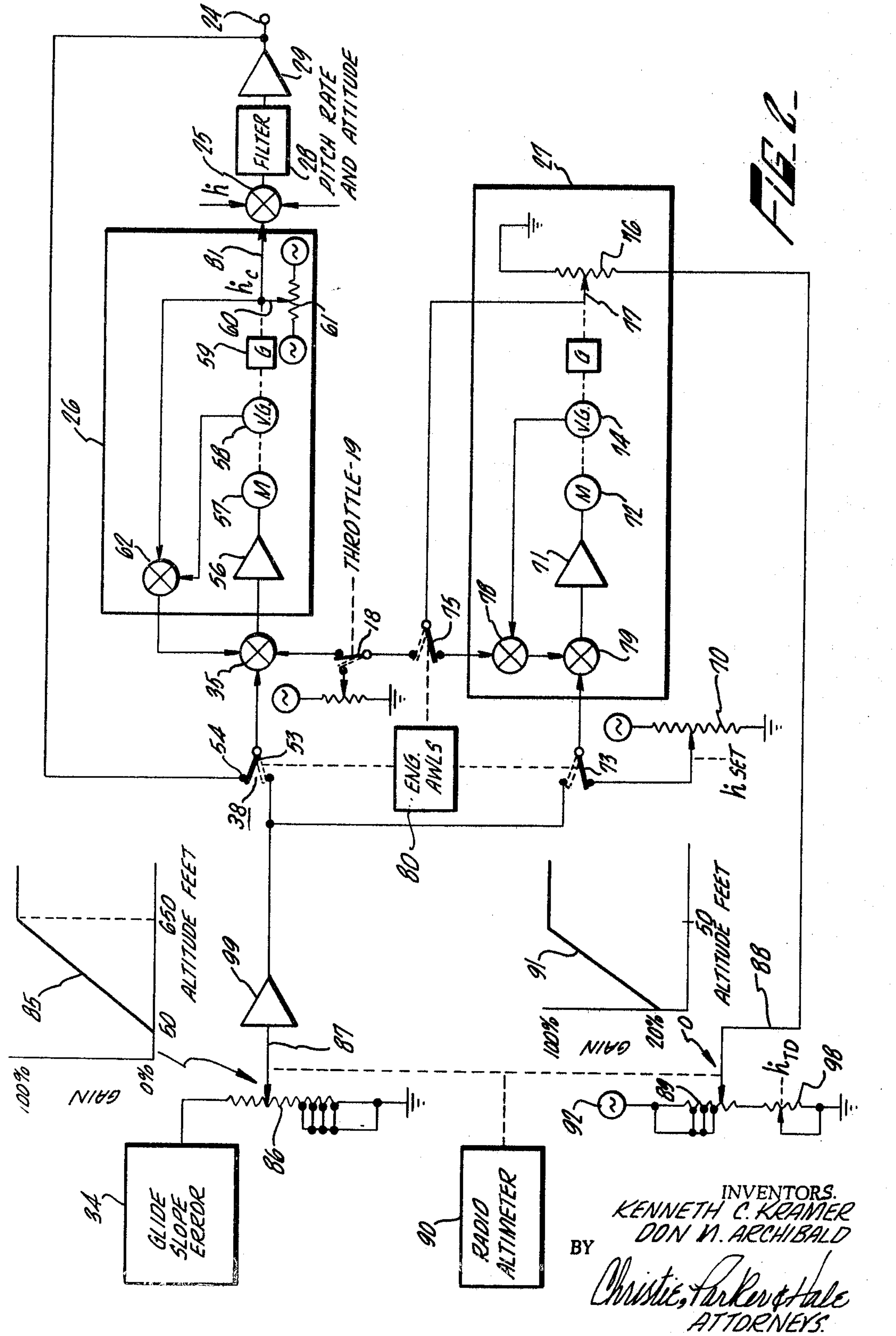

The foregoing principles and features of this invention will be more readily understood by reference to the accompanying drawing in which:

FIG. 1 is a block diagram of a new and improved automatic landing pitch axis control system in accordance with the principles of this invention; and FIG. 2 is a combined block diagram and detailed circuit schematic of certain portions of the system of FIG. 1.

Turning now to FIG. 1, a block diagram of an all-weather landing system in accordance with this invention is shown. The circuit of FIG. 1 includes a plurality of switches which are engaged either automatically or manually by a pilot when it is desired that a normal autopilot flight be terminated and an automatic landing sequence take place.

In the past, systems which have utilized such engagements switches normally experience an abrupt movement of the aircraft when the normal flight terminates and the automatic landing approach starts. Such abrupt movements are avoided by the circuitry of this invention in that means for constantly monitoring the various factors which would cause such an abrupt movement are eliminated by the generation of a negative feedback cancellation signal.

In normal flight and prior to the engagement of the automatic all-weather landing system of this invention, the engagement switches 37 and 38 are in the position shown. A summing junction 25 receives electrical signals from circuit 30, and a summed electrical signal from junction 32. The signal output from summing junction 25 is filtered, amplified, and applied at output terminal 24 to any suitable elevator actuating mechanism. One such suitable actuating mechanism would be an autopilot elevator control of which many types are well known in the art.

Circuit 30, which is connected to summing junction 25, is a vertical velocity computer. The signal output from this instantaneous vertical velocity computer 30 is a signal which is proportional to the actual rate of descent of the aircraft. This signal is often termed $\dot{h}$.

Numerous vertical velocity computers are available for developing this actual rate of descent signal $\dot{h}$. For example, reference to the foregoing mentioned patent discloses one typical instantaneous vertical velocity computer. The computer as described in the reference patent with respect to FIG. 1 thereof includes a barometric rate of descent or climb circuit for generating one signal, and a circuit for providing the integral of a vertical accelerometer as a second signal. These two signals are summed electrically and are shaped by a lag circuit so that the resulting output is an instantaneous vertical velocity, or pure altitude rate signal, $\dot{h}$. Also present in FIG. 1, at summing junction 25, in addition to the actual altitude rate signal $\dot{h}$, is an attitude smoothing signal which is present on lead 31. This attitude smoothing signal is developed at summing junction 32 by two distinct electrical signals. One input signal to summing junction 32 is from the pitch rate gyro 33. Pitch rate gyroscopes are well known in the art and develop output signals which are proportional to the rate of pitch of the aircraft. The second electrical input signal applied to junction 32 is a filtered pitch attitude signal that is proportional to the pitch attitude of the aircraft. Both of these two signals which are received by the summing junction 32 oppose any abrupt changes in attitude and serve to smooth out the command signals that are applied to the summing junction 25. The output signal from summing junction 25 is filtered, amplified, and applied to the output terminal 24. This signal at terminal 24 provides soft yet positive and adequate maneuvering of the aircraft.

Between the output terminal 24 and the summing junction 25 is a feedback loop that applies a negative feedback signal to summing junction 25. The feedback loop consists of the glide slope repeater 26 connected as a synchronizer by switch 38. In this mode of operation any signal appearing at the output terminal 24 is reduced to zero by driving the output signal of the glide slope repeater 26 to be equal and opposite to the sum of the remaining two signals appearing at summing point 25. In this manner, the output signal 24 is maintained at zero to assure no undesired change in aircraft pitch attitude at the time of engagement of the automatic all-weather landing system.

The glide slope error circuit 34 of FIG. 1 is any well known error detector that is mounted in the aircraft. This error detector functions in a normal manner, in that it receives a signal which is transmitted by a transmitter located on the runway. This runway-located transmitter transmits a signal along a desired glide slope path which defines a desired approach path to be followed by the airplane. The error detector 34 detects the glide slope path and generates an electrical signal which is proportional to the displacement of the aircraft from the center of the glide slope path. The glide slope signal is a maximum at both outside edges with the signal decreasing in strength uniformly to a center beam which is zero signal level and which constitutes the desired approach descent of the aircraft. This error signal from the circuit 34 is fed to the glide slope gain scheduler 36 through the engage switch 37.

The glide slope gain scheduler, integrator and flare computer 36 accepts signals from the glide slope error detector 34, the ratio altimeter 90 and an initial conditions circuit 46. The function of the glide slope gain scheduler 36 will be described in detail with respect to FIG. 2. Basically, however, this circuit provides a means of reducing the glide slope gain as a function of radio altitude; provides a means of deriving the integral of the glide slope error; accepts the initial condition to provide a pitch down command at the engage point; and provides a command signal to flare the aircraft.

As described previously, the output signal 24 is maintained at zero by synchronization, however, at the time of engagement, at or near the glide slope beam center, a pitch down command is required. By moving switch 38, 37 to the position indicated by dotted lines the output of circuit 36 is connected to circuit 26. The output of circuit 36 is composed of the initial conditions, glide slope error and the integral of glide slope error. The output signal of circuit 36 is rate limited by circuit 26 in order to assume freedom from any sudden disruptive command signals to summing point 25. Thus, circuit 26, in effect, provides an acceleration limiter on the altitude rate input signal.

In FIG. 2 the summing junction 25 is repeated and the instantaneous vertical velocity, $\dot{h}$ the pitch rate and pitch attitude signal of lead 31 are shown applied to that summing junction. The feedback loop for the repeater and synchronizer circuit 26, as shown in FIG. 2, feeds back the signal which is applied to output terminal 24 to switch 53, which is closed at terminal 54 to complete the feedback loop. This feedback signal is applied to a summing junction 35. The repeater and synchronizer circuit 26 includes an amplifier 56 which in turn actuates a servomotor 57. Servomotor 57 has attached to its output shaft a velocity generator 58 and a mechanical coupling gear reduction network 59. The gear reduction network 59 is appropriately chosen so as to drive a slider arm 60 of potentiometer 61 at a predetermined speed.

Two energizing sources are connected at opposite ends of potentiometer 61. These sources are chosen to be equal and opposite in phase in order to develop a $\dot{h}_c$ signal which can provide a vertical velocity in an ascending or descending direction.

The output of velocity generator 58, in a manner known in the art, is fed back to a summing junction 62 together with a signal from the slider arm 60. These two signals after summation in junction 62, are applied to the summing junction 35. This operation in circuit 26 repeats the input signal which is fed back from the output terminal 24 at the potentiometer 61. This repeated signal is then reapplied to the summing junction 25 as a synchronizing signal so that summing junction 25 and thereby output terminal 24 is nulled to approximately a zero signal level, during normal flight operations.

Prior to entering the glide slope path the pilot generally knows not only the slope of the glide path (normally 3 degrees with respect to the horizontal runway) but also the anticipated rate of descent of an aircraft which enters the glide path. This anticipated rate of descent, as estimated by the pilot is an initial condition which is manually established at potentiometer 70. This anticipated rate of descent is termed $\dot{h}_{set}$. This $\dot{h}_{set}$ signal from potentiometer 70 is applied prior to engagement of the automatic landing system through closed switch 73 to the input of a repeater and integrator circuit 27. This circuit 27 operates in two different modes depending upon whether or not the automatic landing system is engaged. Circuit 27 as depicted with the switches 73 and 75 closed in the positions shown by solid lines, functions as a repeater circuit. As such, it operates identically to that of repeater circuit 26. Thus the $\dot{h}_{set}$ signal, in a manner similar to that described with reference to repeater circuit 26, is repeated at potentiometer 76 by an appropriate positioning of potentiometer slider arm 77.

When switch 75 is open, however, the circuit 36 is no longer a repeater but functions as an integrator. The integrating operation in a manner well known in the art, includes an amplifier 71, a motor 72, and a velocity generator 74. Only a signal from velocity generator 74 is fed back through summing junctions 78 and 79 to the input of amplifier 71 because switch 75 has opened the feedback loop from slider 77. This combination of components, as is well known, perform an integration operation on any input signal fed to the input junction 79. An integral of the input signal is represented by appropriate positioning of slider 77 on the potentiometer 76.

Switch 75, along with switches 53 and 73, are simultaneously controlled when the automatic landing system is engaged as shown symbolically by block 80. With the automatic landing system engaged the switches 53, 73 and 75 assume the closed positions shown in dashed lines. Accordingly, circuit 27, in the manner just described when switch 75 is in the dashed position as shown, constitutes an integrator during all portions of an automatic landing sequence. This integrator circuit 27 compensates for any long-term errors developed by the aircraft's position with respect to the glide beam path in a manner to be described in detail hereinafter. Repeater circuit 26 repeats any short-term glide path errors.

With the automatic landing system engaged, the output signal on lead 81, from circuit 26, is applied to the summing junction 25 as an altitude rate command signal $\dot{h}_c$. This signal is a combinaiton of the altitude rate preset value $\dot{h}_{set}$, glide slope error integration (for long-term errors) and direct glide slope error compensation (short-term errors). This combined output signal on lead 81 for summing junction 25 provides a direct correction of the aircraft to place it in the center of the glide slope path and also provides for a full correction of the preset altitude rate signal in the event that such signal results in an aircraft deviation from the center of the glide slope path.

Thus, if it is assumed that the glide slope path combined with the forward speed of the aircraft at the moment that the automatic landing system is engaged, does not represent the preset altitude rate signal $\dot{h}_{set}$ established manually at potentiometer 70, then an error signal will be generated because the aircraft is not precisely at the center of the glide slope path. If it is assumed that the engagement operation took place at an altitude in excess of 650 feet, a glide slope error signal is generated by circuit 34 in the manner described hereinbefore with respect to FIG. 1. This error signal at altitudes in excess of 650 feet, as shown by the waveform 85 which is a plot of the gain of potentiometer 86 with respect to aircraft altitude in feet, is applied with 100 percent gain amplification through the closed switches 53 and 73 to summing junctions 35 and 79. This glide slope error signal, in the manner described earlier, causes slider 60 of repeater circuit 26 to move until a corrective maneuver that guides the aircraft to the center of the glide slope beam has taken place. This corrective maneuver is also aided by the integral of the glide slope error which, as described earlier, is developed by circuit 27 at slider 77 on potentiometer 76. The glide slope error integration signal tends to provide a slower correction than does the direct application of the glide slope error through repeater circuit 26. This signal through repeater circuit 26 as applied directly from the glide slope error source 34 is a short-term error compensation which provides for immediate response in the elevators.

As is described in the earlier referenced patent, the glide slope beam, at lower altitudes (approximately 650 feet and below) deteriorates in guidance quality with the result that considerably less significance can be placed on the glide slope error source 34. Accordingly, the radio altimeter 90 is mechanically coupled to the two slider arms 87 and 88 positioned respectively on potentiometers 86 and 89. This radio altimeter 90, by positioning the slider arm 87, in accordance with an altitude function, decreases the gain represented in potentiometer 86 by the waveform percentages shown at 85. The slope of the gain characteristic between 650 and 50 feet in altitude represents an intermediate mode of landing sequence during which the glide slope error signal is continually modified. The modification of this signal is a decrease in its strength from 100 percent gain at a maximum position of about 650 of altitude to zero percent at an altitude of about 50 feet. Thereafter the glide slope error signal is no longer of use, and it is not applied to the longitudinal landing computer circuitry.

Between the 50 foot altitude level and just prior to touchdown of the aircraft on the runway, special programming is developed which reduces the altitude rate command $\dot{h}_c$ present at lead 81 for summing junction 25 from the preset value $\dot{h}_{set}$ to a selected touchdown rate which is approximately 2 feet-per-second. This 2 feet-per-second $\dot{h}_{TD}$ signal is chosen to insure that the aircraft touches down on the runway with a finite and positive vertical rate. Waveform 91 discloses that the gain for potentiometer 89 develops a signal at slider 88 which proportionately decreases from 100 percent gain at about 50 feet in altitude to a touchdown gain percentage at zero feet in altitude. This touchdown gain percentage is nominally chosen at about 20 percent by appropriate adjustment of potentiometer 98. Thus, if the horizontal $\dot{h}_{set}$ was initially chosen approximately ten feet-per-second, the 20 percent value represents an altitude rate touchdown command signal $\dot{h}_{TD}$ of 2 feet-per-second. During this flare-out operation it is obvious that even though switches 53 and 73 are connecting the glide slope error source 34 to summing junction 79, altimeter 90 has moved slider 87 to a point where there is no signal applied to input amplifier 99.

Accordingly, wipers 60 and 77 of circuits 26 and 27 are not subject to any further mechanical movement in response to glide slope errors. Potentiometer 76, however, is connected to wiper arm 88 and thus any signal deviations applied at potentiometer 89 are reflected as a voltage deviation at potentiometer 76. Potentiometer 89 reduces the excitation from source 92 to 20 percent gain between 50 feet altitude and touchdown. Potentiometer 98 maintains such excitation as an $\dot{h}_{TD}$ signal for application to circuit 27 in accordance with waveform 91. This reduction in excitation proportionately reduces the magnitude of the signal developed at potentiometer 76 as picked off by the fixed position of slider arm 77. This decrease in signal at potentiometer 76 is repeated by the circuit 26 and a decreased $\dot{h}_c$ signal is applied at lead 81 for summing junction 25. This $\dot{h}_c$ signal continually assures the application of a signal that develops the chosen touchdown rate because the potentiometers 89, 76 and 61 are electrically connected in tandem to the summing junction 25. Accordingly, the desired touchdown rate is constantly and continually assured by the computer circuitry of this invention.

It should be understood, of course, that during the foregoing landing operation, as just described, the altitude rate command signal $\dot{h}_c$ is continually compared with the actual rate of descent signal $\dot{h}$ and the attitude smoothing signals from the pitch rate and pitch attitude components. These signals cooperate to oppose any abrupt changes in aircraft attitude and serve to smooth out long-term commands throughout the entire landing sequence.

If at any point during the landing maneuver an emergency were to develop, requiring the pilot to discontinue the landing procedure, a "go-around" operation may be instituted. The pilot, if such an emergency developed, may disconnect the automatic landing procedure just described and connect the "go-around" command assist circuit 20, FIG. 2, by pushing hard forward on the throttle 19. Pushing forward on throttle 19 causes switch 18 to disconnect the altitude rate command signal $\dot{h}_c$ coming from the receiver circuit 26 to the summing junction 25. Switch 18 at the same time connects the go-around assist command signal from source 20 to summing junction 25. This go-around assist signal is chosen to be a predetermined set value that commands the elevator actuators to direct the aircraft up and away from the landing strip. The aircraft would then either manually circle, or circle on normal autopilot and return to the glide path beam for another landing approach.

It is to be understood that the foregoing features and principles of this invention are merely descriptive, and that many departtures and variations thereof are possible by those skilled in the art, without departing from the spirit and scope of this invention.

What is claimed is:

1. An automatic pitch axis control system in an aircraft to be controlled free of any abrupt changes in aircraft attitude when an automatic landing sequence is initiated in said system comprising:

(a) first signal generating means for emitting a combined signal representative of the vertical velocity, pitch rate and pitch attitude of said aircraft;

(b) an elevator control electrically connected to said signal generating means for controlling the pitch axis of said aircraft;

(c) means interposed between said elevator control and said first signal generating means for feeding back a counteracting signal to continually null the signal applied to said elevator control;

(d) second signal generating means for emitting a controlled variable signal for application to said elevator control to fly said aircraft from an approach point to touchdown on a landing area; and (e) switch means for interrupting said counteracting signal and completing a circuit from said second signal generating means to said elevator control, said completed circuit including said feedback means for limiting the rate of application of said fly-down signal to said elevator control whereby disruptive changes in said aircraft attitude are avoided.

2. An automatic pitch axis control system in accordance with claim 1 further comprising:

(a) third signal generating means for emitting an axis control signal commanding said elevator control to assume a condition opposite to that assumed in response to said second signal generating means; and (b) switch means for disconnecting said second signal generating means and connecting said third signal generating means to said elevator control.

3. An automatic pitch axis control system in accordance with claim 2, wherein said switch means is mechanically coupled to said throttle and operable in response to a pilot initiated full throttle movement.

4. An automatic pitch axis control system in an aircraft to be controlled comprising:

(a) first signal generating means for developing an output signal proportional to the instantaneous vertical velocity of said aircraft;

(b) second signal generating means for developing an output signal proportional to the pitch attitude and pitch rate of said aircraft;

(c) an electrical junction common to said first and second signal generating means for electrically summing the output signals thereof;

(d) a signal responsive device for controlling said aircraft about its pitch axis;

(e) signal applying means connected to said common junction and said signal responsive device;

(f) third signal generating means generating a continually varying signal capable of continuously modifying said aircraft about its pitch axis from an approach point to touchdown on a landing area;

(g) feedback circuit means connected between said summing junction and said signal applying means for continually nulling said summed signal applied to said signal responsive device; and (h) switch means for opening the connection between said feedback circuit and said pitch axis control device and for completing a circuit through said feedback means to said third signal generating means, said feedback means in said last claimed completed circuit being operative for gradually applying to said pitch axis control device signals generated by said third signal generating means whereby disruptive attitude changes in said aircraft are prevented.

5. A control system in an aircraft to be automatically landed comprising:

(a) means for continually monitoring the aircraft's vertical velocity, pitch rate and pitch attitude and for generating signals representative thereof;

(b) a junction for combining said signals into a resultant signal;

(c) an elevator control means connected to said junction;

(d) means for generating a controlled variable signal for application to said elevator control means for automatically landing said aircraft;

(e) means selectively operative for connecting said automatic landing signal generating means to said junction; and (f) means connected between said elevator control means and said junction and operative prior to operation of said selectively operative connecting means for electrically nulling said junction by the application thereto of a signal opposing said resultant signal.

6. A system in accordance with claim 5 wherein said last claimed nulling means includes a first signal repeater having an input connected to the connection between said junction and said elevator control means and an output connected to said junction.

7. A system in accordance with claim 6 and further comprising switching means connected between said first repeater's input and said elevator control means, said switching means being operative simultaneously with said selectively operative means for interrupting said completed nulling circuit and for connecting said repeater input to said automatic landing signal generating means.

8. A system in accordance with claim 7 wherein said automatic landing signal generating means comprises:

(a) means operative to emit a signal for initially establishing the attitude of said aircraft about its pitch axis at a predetermined value upon entering an approach area to said runway; and (b) a second signal repeater having its input connected to said signal generating means and an output terminal connected to said switching means for applying said initial attitude establishing signal to said junction through said first repeater circuit when said feedback circuit is interrupted.

9. A system in accordance with claim 8 which is used in conjunction with a transmitting means located on a landing area for providing electrical signals along a desired landing approach path and wherein said automatic landing signal generating means in said aircraft further comprises:

(a) means for emitting an electrical signal proportional in magnitude to the vertical deviation of said aircraft from said desired landing path;

(b) means for applying said vertical deviation signal to said first signal repeater and to said second signal repeater;

(c) means in said second signal repeater for converting said repeater to a signal integrator simultaneously with the application of said deviation signal thereto;

(d) means to detect the altitude of said aircraft; and (e) means responsive to said altitude detection means for progressively modifying the strength of said deviation signals applied to said first repeater and said integrator.

No references cited.

FERGUS S. MIDDLETON, *Primary Examiner.*

B. BELKIN, *Assistant Examiner.*